US008943558B2

United States Patent
Jankowski et al.

(10) Patent No.: US 8,943,558 B2
(45) Date of Patent: *Jan. 27, 2015

(54) SYSTEM AND METHOD FOR MONITORING A THREAT

(71) Applicant: Next Level Security Systems, Inc., Carlsbad, CA (US)

(72) Inventors: Peter A. Jankowski, Rancho Santa Fe, CA (US); Chen-Lan Yen, Carlsbad, CA (US); Rand D. Anderson, Cardiff, CA (US)

(73) Assignee: Next Level Security Systems, Inc., Carlsbad, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/790,404

(22) Filed: Mar. 8, 2013

(65) Prior Publication Data
US 2014/0259114 A1   Sep. 11, 2014

(51) Int. Cl.
G06F 7/04        (2006.01)
G06F 15/16       (2006.01)
G06F 17/30       (2006.01)
H04L 29/06       (2006.01)

(52) U.S. Cl.
CPC .................... *H04L 63/14* (2013.01)
USPC ............................. 726/4; 713/158

(58) Field of Classification Search
USPC ............................................. 726/4
See application file for complete search history.

(56) References Cited

U.S. PATENT DOCUMENTS

| 6,064,653 | A  | * | 5/2000  | Farris ........................... 370/237 |
| 2001/0034754 | A1 | * | 10/2001 | Elwahab et al. ............ 709/201 |
| 2002/0111698 | A1 | * | 8/2002  | Graziano et al. ............... 700/17 |
| 2004/0041910 | A1 | * | 3/2004  | Naidoo et al. ............... 348/156 |
| 2006/0022816 | A1 | * | 2/2006  | Yukawa ........................ 340/521 |
| 2006/0155851 | A1 | * | 7/2006  | Ma et al. ....................... 709/226 |
| 2006/0190419 | A1 | * | 8/2006  | Bunn et al. ....................... 706/2 |
| 2007/0286181 | A1 | * | 12/2007 | Bushmitch et al. .......... 370/356 |
| 2013/0279880 | A1 | * | 10/2013 | Kim et al. .................... 386/239 |
| 2013/0290548 | A1 | * | 10/2013 | He ................................ 709/228 |

OTHER PUBLICATIONS

Srdjan Krco; Personal Wireless Sensor Network for Mobile Health Care Monitoring; IEEE; Oct. 1-3, 2003; p. 741-474.*

* cited by examiner

*Primary Examiner* — Mohammad W Reza
*Assistant Examiner* — Monjour Rahim
(74) *Attorney, Agent, or Firm* — Schwegman Lundberg & Woessner, P.A.

(57) ABSTRACT

A method and a system for monitoring a threat are described. The system has a gateway, a web server, and a client device. The gateway detects, identifies, and tracks a threat at a location associated with the gateway. The gateway is coupled to a security device. The web server has a management application configured to communicate with the gateway. The client device communicates with the gateway identified by the web server. The gateway aggregates monitoring data from the security device and from other security devices respectively coupled to other gateways correlated with the gateway. The client device receives the aggregated monitoring data and controls the security device coupled to the respective gateway from a web-based user interface at the client device.

16 Claims, 12 Drawing Sheets

SYSTEM AND METHOD FOR MONITORING A THREAT

TECHNICAL FIELD

This application relates generally to the field of computer technology and, in a specific example embodiment, a system and method for monitoring a threat with a web-based collaborative gateway.

BACKGROUND

Systems for monitoring and/or controlling security devices have become increasingly popular in recent years. Such systems are used to communicate with security devices such as lights, thermostats, or security systems. Some conventional systems for controlling and monitoring security devices allow a user to access a server from a remote location using a device such as a desktop computer. For example, a user can use a desktop computer located in a remote location to connect with the server. The user can then send commands to the server to control various security devices. For example, the user can turn lights on or off. In another example, the user accesses a video feed stored at the server that receives a video stream from a camera at a monitored location.

Such conventional systems for controlling and/or monitoring security devices have at least the following disadvantages and limitations. The connection between the user's remote computer and the server may not be secured. A user could establish a secure connection, but the cost and complexity involved in establishing such a connection are high. Such systems are also complex for users to implement and maintain. For example, the server may be difficult to install and configure. Programming such systems can also be cumbersome and require custom configurations when adding supplemental security devices or services. Last, it is difficult for the user to access the server using different types of remote devices. For instance, conventional systems only allow a user to access the offsite server using, for example, a secured desktop computer located in the user's workplace.

BRIEF DESCRIPTION OF THE DRAWINGS

The present disclosure illustrated by way of example, and not by way of limitation, in the figures of the accompanying drawings in which.

DETAILED DESCRIPTION

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In various embodiments, a method and a system for monitoring a threat at a location associated with a gateway are described. The system has a gateway, a web server, and a client device. The gateway detects, identifies, and tracks a threat at a location associated with the gateway. The gateway is coupled to a security device. The web server has a management application configured to communicate with the gateway. The client device communicates with the gateway identified by the web server. The gateway aggregates monitoring data from the security device and from other security devices respectively coupled to other gateways correlated with the gateway. The client device receives the aggregated monitoring data and controls the security device coupled to the respective gateway from a web-based user interface at the client device.

Figure 1:
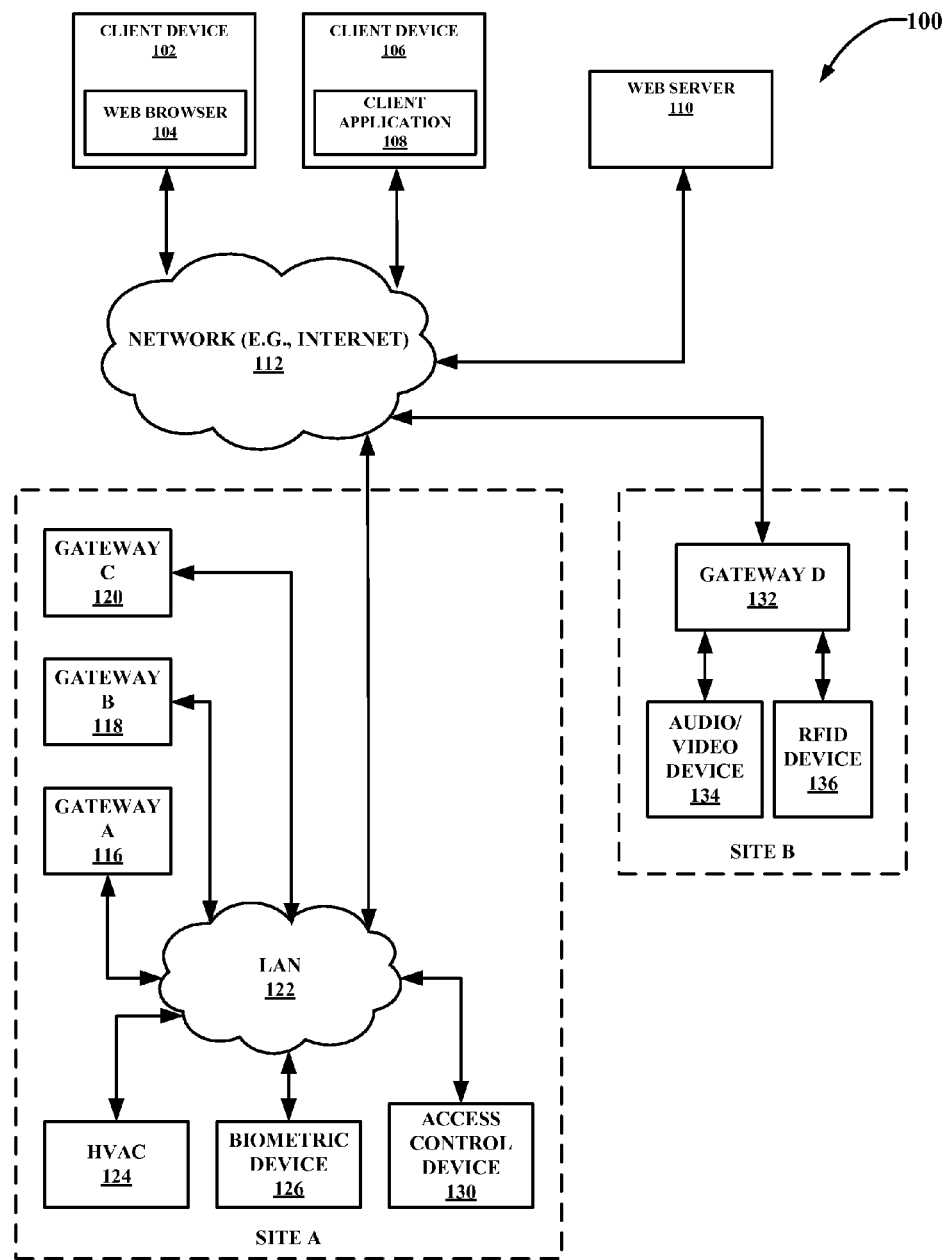
FIG. 1 is a network diagram depicting a network system, according to one embodiment, for exchanging data over a computer network.

FIG. 1 is a network diagram depicting a network system 100, according to one embodiment, for exchanging data over a computer network 112 (e.g. TCP/IP network). For example, the network system 100 comprises client devices 102, 106, a web server 110, and gateways 116, 118, 120 at a location site A, and a gateway 132 at a location site B. For example, location site A may be a store in a city, and location site B may be an office in another city. A location site may include, for example, one or more floors of an office building, a residential house, an embassy, a school building, a school campus, an area of a factory or retail space, and so forth. In another example, location sites may overlap each other.

For purposes of the present embodiment, the terms "sites" and "premises" refer to any location to be monitored, whether residential, commercial, public, or secured. Further, the term "a" is generally used in the present disclosure to mean one or more. Still further, the terms "coupled" and "operatively coupled" mean connected in such a way that data may be exchanged. It is understood that "coupled" and "operatively coupled" do not require a direct connection, a wired connection, or even a permanent connection. It is sufficient for purposes of the present embodiment that the connection(s) be established for the sole purpose of exchanging information.

The client devices 102, 106 are connected to the computer network 112. The client devices 102, 106 can include, but are not limited to, a desktop computer, a laptop computer, a mobile computing device, a mobile smart phone device, and so forth. A network interface means is provided to enable the client devices 102, 106 to send and receive data to and from the computer network 112. The client device 102 may include a web browser 104 that may be in communication with the web server 110 via the computer network 112. In another example, the client device 106 includes a programmatic client, such as a client application 108 configured to communicate with the web server 110 via the computer network 112. The web browser 104 or the client application 108 may be used to display some or all of the information and monitoring data provided by gateways 116, 118, 120, and 132.

The computer network 112 can include a local area network (LAN) where Gigabit Ethernet switches are used to switch data. In another example, the computer network 112 includes a wide area network (WAN), such as the Internet. In general, computer network 112 may be a public network or private network, and a single network or a combination of several networks. In most embodiments, computer network 112 may be, but is not required to be, an IP-based network. In some embodiments it may be desirable for all or a portion of network 112 to include publicly available networks, such as the Internet, to avoid the need for installing, purchasing, or leasing additional infrastructure.

The web server 110 may also connect to the computer network 112 both to receive and transmit data. The web server 110 may also be referred to as a web-based host. The web server 110 is connected to the computer network 112 by a means of a network interface. The network interface can take the form of a network interface card (not shown) installed within the web server 110 to enable data to be sent and received to and from the computer network 112 by the web server 110.

In one embodiment, the web server 110 identifies one or more gateway(s) for the client devices 102, 106 to communicate with, so as to monitor and/or control the security devices connected to the corresponding gateway(s).

In another embodiment, the web server 110 may provide server-side functionality, via the computer network 112, to the client devices 102, 106. The client devices 102, 106 may enable users that utilize the network system 100 and more specifically, the web server 110, to view monitoring data (e.g. audio/video feed) from security devices connected to gateways 116, 118, 120, and 132 over the computer network 112. These transactions may include transmitting, receiving (communicating) and processing data to, from, and regarding monitoring data and users of the network system 100. The data may include, but are not limited to audio, video, picture, metadata, camera configuration data, client device configuration data, and network data monitoring data. The web server 110 can provide other functions including storing monitoring data to an internal or external disk storage device (not shown) and playing back recorded monitoring data. In one embodiment, the web server 110 may perform analytics computation on the data from the gateways 116, 118, 120, and 132.

In one embodiment, the web server 110 may include a directory of gateways and the location of security devices connected to each gateway (e.g., camera a is located in room b at location c associated with gateway d, gateway e is associated with building f, etc.). The web server 110 is described in more detail below with respect to FIG. 3. As such, the web server 110 may correlate the gateway 116 at site A to the gateway 132 at site B. In one embodiment, the correlation may be generated pursuant to pre-defined settings or configurations based on user profile, organization topology, hierarchy, bandwidth and other factors. For example, a user at client device 102 may be a manager responsible for stores located on the West coast. If both sites A and B are on the West coast, the web server correlates gateway 116 to gateway 132. As such, based on the user profile and the organization topology, the user only needs to access gateway 116 to obtain monitoring data from sites A and B. In other words, the user does not have to communicate directly with several gateways to monitor all security devices attached to the corresponding gateways. In another embodiment, the web server 110 may correlate gateway 116 with other gateways. In yet another embodiment, the other gateways may be correlated with other gateways. For example, information from other gateways correlated with the gateway 132, which is correlated with gateway 116, may be communicated with the user at the client device 102 or 106.

Generally, gateways 116, 118, 120, and 132 include a processor-based device that operates to monitor conditions at a target site or premise, analyze monitoring data, detect alarm conditions at the target site or premise, capture information relating to such alarm conditions, and send such monitoring information to client devices 102, 106 and/or the web server 110.

Gateways 116, 118, and 120 are located at the same site A. In one embodiment, gateways 116, 118, 120 are capable of balancing their respective loads. Furthermore, gateways 116, 118, 120 may provide a redundant backup of each other. Gateways 116, 118, 120 are connected to a local area network LAN 122. In another embodiment, gateways 116, 118, 120 communicate with one another via a peer-to-peer network.

Security devices (e.g., monitoring devices and controlling devices) 124, 126, and 130 are connected to the gateways 116, 118, 120 via LAN 122. Monitoring devices include, for example, sensors. The gateways are not limited to connecting to any specific type or model of sensors or monitoring devices. Any sensor may be used, depending on the desired type and level of protection. Examples include, without limitation, microphones, cameras, magnetic contact switches, audio sensors, infrared sensors, motion detectors, fire alarms, and carbon monoxide sensors. For illustration purposes, location site A in FIG. 1 includes a biometric device 126 (e.g., fingerprint reader) and an access control device 130 (e.g., door/gate access sensor).

In addition, controlling devices may include devices that can be controlled such as a HVAC system 124 (e.g., heater/air conditioning system including thermometer, smoke sensor, thermostat), a gate/door lock, and a camera positioning system (e.g., tilt, pan).

The HVAC system 124, the biometric device 126, and the access control device 130 are located at site A and are connected to the gateway 116 via LAN 122.

The gateway 132 is located at another location site B away from location site A (e.g., different physical locations). An audio/video device 134 (e.g., camera, microphone) and an RFID device 136 (e.g., card reader) are directly connected to gateway 132. The gateway 132 communicates with the computer network 112.

In another embodiment, gateways 116, 118, and 120 from site A communicate with the gateway 132 from site B. As such, client devices 102, 106 can monitor data from audio/video device 134 and RFID device 136 connected to the gateway 132 by communicating only with gateway 116. Similarly, client devices 102, 106 can monitor data from the HVAC 124, the biometric device 126, and the access control device 130 connected to gateway 116 by communicating only with the gateway 132.

Figure 2A:
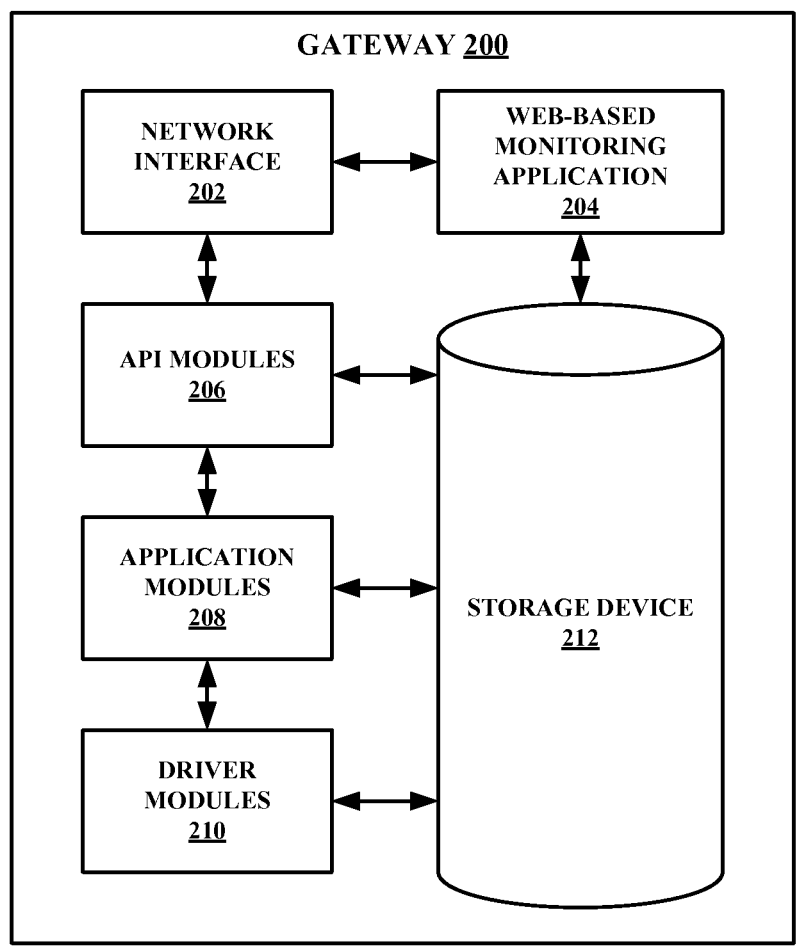
FIG. 2A is a block diagram illustrating an example embodiment of a gateway.

FIG. 2A is a block diagram illustrating an example embodiment of a gateway 200. The gateway 200 includes a network interface 202, API modules 206, application modules 208, driver modules 210, a web-based monitoring application 204, and a storage device 212. The network interface 202 enables the gateway to communicate with the computer network 112. The API enables the gateway 200 to interface with the client devices 102, 106, the web server 110, and other third party devices (not shown). The application modules 208 enable the gateway 200 to monitor or control the corresponding monitoring or controlling devices connected to the gateway 200. In addition, the application modules 208 enable the gateway 200 to provide add-on expandable services discussed further below. The driver modules 210 include device drivers to enable interaction of the application modules 208 with the hardware of the corresponding monitoring or controlling devices. The web-based monitoring application 204 enables the gateway 200 to communicate monitoring and controlling data with the client device. The web-based monitoring application 204 is discussed in more detail with respect to FIG. 2C. The storage device 212 may be used to store monitoring data from the monitoring devices connected to the gateway 200, APIs from API modules 206, software applications from application modules 208, device drivers from driver modules 210, and a configuration of the gateway 200. For example, the configuration of the gateway 200 may include a topology or hierarchy at a user level, organization level, and partner level. The configuration of the gateway may specifically include an enterprise configuration of gateway (based on the topology/hierarchy previously mentioned). In one embodiment, the configuration of the gateway 200 may be replicated to other gateways that are correlated by the web server based on the topology/hierarchy. For example, some gateways can have access control to a limited number of security devices. In another embodiment, each gateway may be custom configured. In another embodiment, the gateway is configured to aggregate data from multiple gateways (that may be correlated by the web server 110 based on the topology) and present the aggregated data to the client device.

Figure 2B:
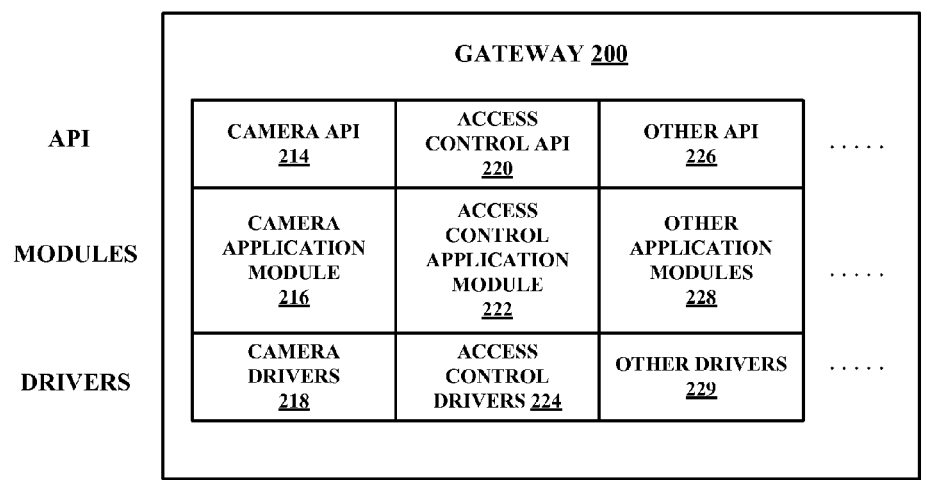
FIG. 2B is a block diagram illustrating another example embodiment of a gateway.

FIG. 2B is a block diagram illustrating another example embodiment of the gateway 200. For example, the gateway 200 includes a camera API 214, a camera application module 216, and camera drivers 218. The camera API 214 provides an interface to the web browser 104 or the client application 108 of the client devices 102, 106 to receive and send data from a camera connected to the gateway 200. The camera application module 216 enables the client device to receive data (e.g., audio and video) from the camera via the camera API 214. In another embodiment, the camera application module 216 enables the client device to send commands (e.g., focus, tilt, pan, zoom) or data to the camera via the camera API 214. The camera drivers 218 include one or more drivers for different brands or manufacturers of camera.

In another example, the gateway 200 may also include an access control API 220, an access control application module 222, and access control drivers 224. The access control API 220 provides an interface to the web browser 104 or the client application 108 of the client devices 102, 106 to receive and send data from an access control device (e.g., a door access at a monitored site) connected to the gateway 200. The access control application module 222 enables the client device to receive data (e.g., time and ID log of the door access at the monitored site) from the access control device via the access control API 220. In another embodiment, the access control application module 222 enables the client device to send commands (e.g., open, close, lock door) or data to the access control device via the access control API 220. The access control drivers 224 include one or more drivers for different brands or manufacturers of access control devices.

One advantage of one of the embodiments of the gateway 200 is the ability to easily connect additional devices or third party devices. This is illustrated with respect to other API 226, other application modules 228, and other drivers 229. As such, the gateway 200 is not limited to any particular manufacturer of devices or brand of devices. The gateway 200 allows for easy expansion and plug-in features using additional APIs, corresponding modules, and corresponding device drivers.

Figure 2C:
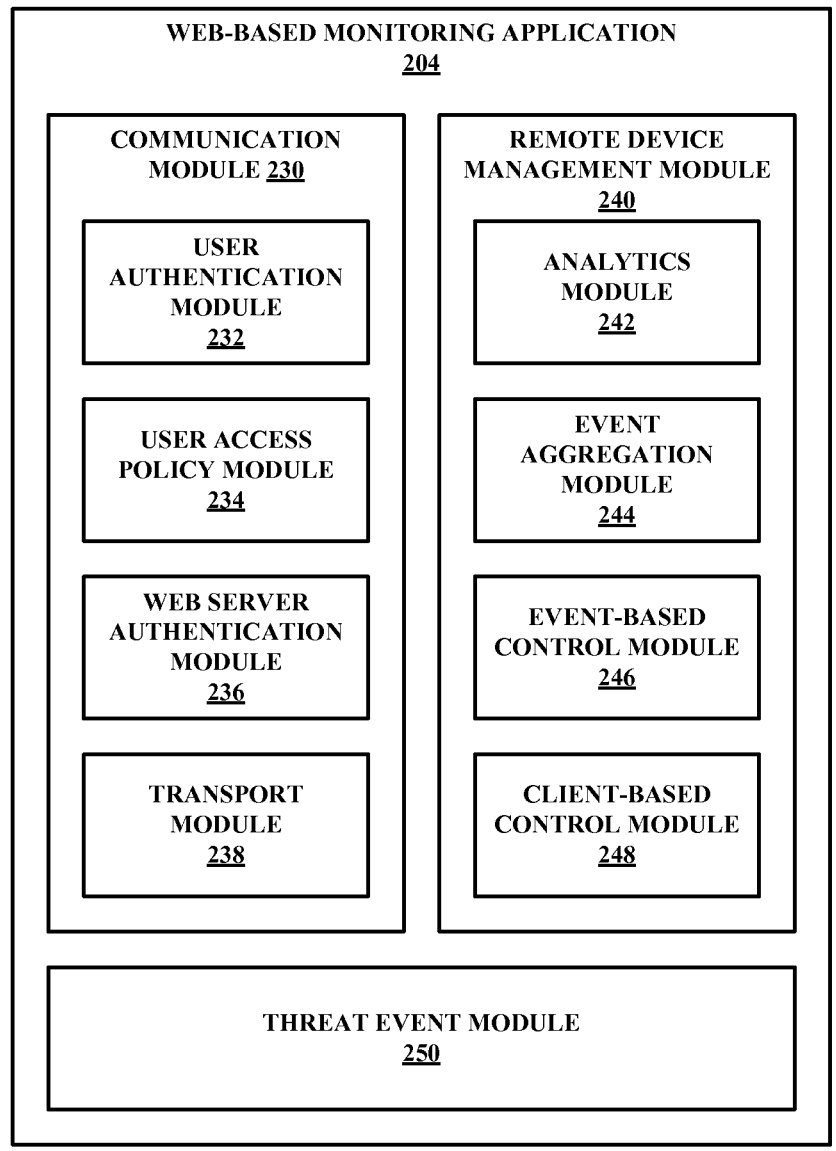
FIG. 2C is a block diagram illustrating an example embodiment of a web-based monitoring application of the gateway of FIG. 2A.

FIG. 2C is a block diagram illustrating an example embodiment of the web-based monitoring application 204 of the gateway 200. The web-based monitoring application 204 enables client devices to remotely monitor and control monitoring and controlling devices connected to the gateway 200 via the web browser 104 or the client application 108 at the client devices 102, 106. In one embodiment, the web-based monitoring application 204 includes a communication module 230, a remote devices management module 240, and a threat event module 250. The communication module 230 enables communication between the gateway 200 and the client devices 102, 106. The remote devices management module 240 enables the client devices 102, 106 to monitor and control devices connected to the gateway 200.

In one embodiment, the communication module 230 includes a user authentication module 232, a user access policy module 234, a web server authentication module 236, and a transport module 238.

The user authentication module 232 authenticates a user at the client device based on a user profile of the user. An example of user authentication may include verifying the username and password provided by the client device with a predefined user profile. The predefined user profile may be stored in the storage device 212 or at the web server 110.

The user access policy module 234 limits or grants the user at the client device access to the monitoring and/or controlling devices connected to the gateway. For example, a user with limited privilege may have access to the monitoring data to a particular site (e.g., first floor only) or a specific monitoring device (e.g., HVAC only). On the other hand, a user with executive privilege may be able to view monitoring data and control security devices from more sites.

The web server authentication module 236 authenticates a communication between the gateway 200 and the web server 110. For example, the gateway transmits a unique token to the web server 110 for authentication prior to establishing the secured communication. Those of ordinary skills in the art will recognize that other means of authentication between the gateway and the web server 110 may be used.

The transport module 238 enables peer-to-peer communication between gateways. As such, a client device communicating with one gateway at a first location is also able to communicate with another gateway at a second location.

In one embodiment, the remote devices management module 240 of the web-based monitoring application 204 includes an analytics module 242, an event aggregation module 244, an event-based control module 246, and a client-based control module 248.

The analytics module 242 analyzes audio/video, and other detected changes from the monitoring devices and generates events based on the analysis. For example, the analytics module 242 is capable of determining how many people have entered or left an activity zone (e.g., a room, a hallway) in a video feed, the direction of the movement of individuals in a video feed, the temperature of individuals in a video feed, facial recognition of individuals in a video feed, and so forth. Events are generated based on the analysis and predefined user-configured settings. A user at the client device is able to configure the conditions for generating an event from the web browser 104 of the client device 102 or the client application 108 of the client device 106.

The event aggregation module 244 aggregates events generated from the analytics module 242. For example, events generated based on the analysis and predefined/user-configured settings are aggregated in a log stored in a storage device attached to the gateway, in a storage device attached to another gateway, in a storage device attached to the web server 110, or in a storage device connected to the client device.

The event-based control module 246 communicates a command to at least one controlling device connected to the corresponding gateway based on an event identified in event aggregation module 244 based on an event configuration. For example, an event comprises a temperature of a room reaching a predefined maximum temperature. The event-based control module 246 may communicate to the HVAC system to turn on the air conditioning system for the room if such an event occurs.

The client-based control module 248 communicates a command to one or more controlling devices of the corresponding gateway based on a command initiated and communicated from the client device. For example, a user at the client device may initiate a command to pan a camera connected to the gateway. Such a command would be communicated to the camera via the client-based control module 248.

The threat event module 250 may be configured to detect, identify, and track a threat at a location associated with the gateway.

Figure 2D:
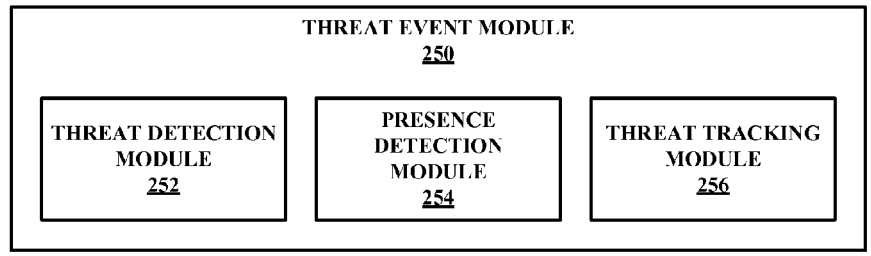
FIG. 2D is a block diagram illustrating an example embodiment of a threat event module of the gateway of FIG. 2A.

FIG. 2D is a block diagram illustrating an example embodiment of the threat event module 250 of a gateway. The threat event module 250 may include a threat detection module 252, a presence detection module 254, and a threat tracking module 256. The threat detection module 252 detects the threat at the location associated with the gateway. The presence detection module 254 identifies the threat at the location. The threat tracking module 256 tracks a movement of the threat at the location.

For example, the threat detection module 252 may detect a robbery in progress based on a trigger from an employee at a store associated with a gateway. The threat detection module 252 may also detect a threat based on audio or video analytics such as detecting the sound signature of a gunshot. Once the threat detection module 252 detects the threat, the presence detection module 254 may identify individuals or objects involved in the threat. For example, the presence detection module 254 may use facial recognition or audio analytics to identify known and unknown individuals and their respective locations (e.g., which room or building). Known individuals may be registered individuals who are allowed in the location or building or have access to the location building. The threat tracking module 256 may also track and follow the movement of the known and unknown individuals. In one embodiment, the threat tracking module 256 may consider unknown individuals as a source of threat.

Figure 2E:
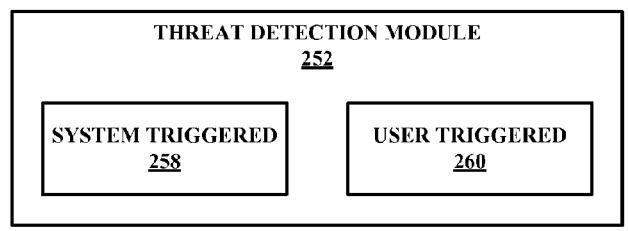
FIG. 2E is a block diagram illustrating an example embodiment of a threat detection module of the gateway of FIG. 2A.

FIG. 2E is a block diagram illustrating an example embodiment of the threat detection module 252. The threat detection module 252 may include a system triggered threat module 258 and a user triggered threat module 260. The system triggered threat module 258 may detect a threat based on user-defined parameter thresholds from one of the security devices connected to the gateway. For example, the user-defined parameter thresholds may include the detection of the sound of gunfire, an alarm, or screams. As such, the system triggered threat module 258 may generate a notification of a threat at a location associated with the gateway when the sound of the gunfire at the location is detected.

The user triggered threat module 260 detects a threat based on a user triggered alert notification received at the gateway. For example, depressing an emergency switch connected to the gateway may trigger a notification of a threat at a location associated with the gateway.

Figure 2F:
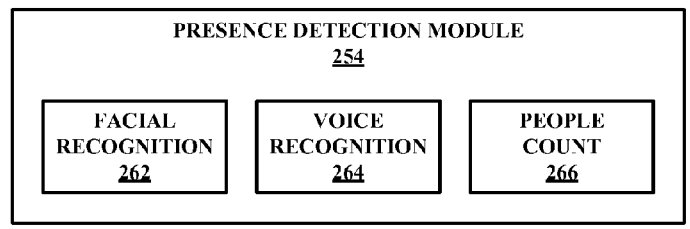
FIG. 2F is a block diagram illustrating an example embodiment of a presence detection module of the gateway of FIG. 2A.

FIG. 2F is a block diagram illustrating an example embodiment of the presence detection module 254. The presence detection module 254 may access data from a directory of individuals of an organization associated with the location of the gateway. The presence detection module 254 may include a facial recognition module 262, a voice recognition module 264, and a people count module 266.

The facial recognition module 262 may identify an individual using a facial recognition algorithm applied onto an image provided by the security device at the gateway. For example, the facial recognition module 262 may recognize employees of a bank using a database of bank employee identifications.

The voice recognition module 264 may identify an individual using a voice recognition algorithm applied to an audio provided by one of the security devices (e.g., microphone) at the gateway. For example, the voice-recognition module 264 may recognize the voices of a school staff using a database of school staff voice samples.

The people count module 266 may count the number of persons or individuals from the image(s) provided by the security devices at the gateway. For example, the people count module 266 may estimate and infer the number of people in a room based on video or pictures from different cameras disposed throughout the room. The people count module 266 may rely on the facial recognition module 262 to determine that the same person is being shown in pictures from different cameras.

Figure 2G:
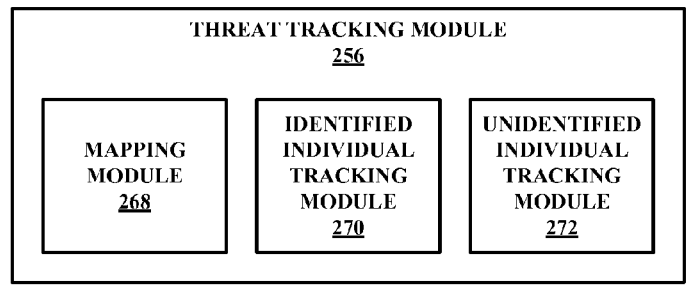
FIG. 2G is a block diagram illustrating an example embodiment of a threat tracking module of the gateway of FIG. 2A.

FIG. 2G is a block diagram illustrating an example embodiment of a threat tracking module 256. The tracking module 256 includes a mapping module 268, an identified individual tracking module 270, and an unidentified individual tracking module 272.

The mapping module 268 may determine or retrieve a schematic layout (or map) of the location associated with the gateway. For example, the mapping module 268 may retrieve a map of a building showing the different rooms. The mapping module 268 may also identify where the different security devices associated with the gateway are disposed throughout the different rooms. For example, the mapping module 268 may show the location of a camera and the angle covered by the camera in a room. Furthermore, access controls such as locks may also be identified in the map.

The identified individual tracking module 270 may track a position of an identified individual in the layout. For example, the identified individual tracking module 270 may track the position and movement of a staff teacher in a school building or a bank teller in a bank. For example, a representation of the room in which the identified individuals are located may be highlighted on a map (e.g., flashing green) to indicate the presence of identified individuals. In another embodiment, a breadcrumb trail (e.g., a series of indicators such as dots or dashes) displayed on a map may show the past movements of the identified individuals.

The unidentified individual tracking module 272 may track a position of an unidentified individual in the layout. In one example, the threat tracking module 256 may identify the unidentified individual as a potential threat at the location of the gateway. For example, the unidentified individual tracking module 272 may track the position and movement of the unidentified individual in a school, in a bank, or in any physical location associated with the gateway. Furthermore, the unidentified individual tracking module 272 may generate a visual emphasis in the layout of the position and movement of the unidentified individual. For example, a representation of the room in which where the unidentified individual is located may be highlighted on a map (e.g., flashing red) to indicate the present location of the unidentified individual. In another embodiment, a breadcrumb trail displayed on a map may show the past movements of the unidentified individual.

In another embodiment, the unidentified individual tracking module 272 may determine or predict future movements of the unidentified individual based on past movements. For example, the unidentified individual tracking module 272 may compute a combination of paths on the map that the unidentified individual may take (e.g., different arrows on a map showing different possible paths of the unidentified individual in a building).

In yet another embodiment, security devices connected to the gateway at the location of the unidentified individual may be controlled to thwart the threat of the unidentified individual. For example, door locks in the predicted path of the unidentified individual may be controlled by the gateway to lock the doors in the path of the unidentified individual. In another example, smoke generators disposed in the predicted path or at the location of the unidentified individual may be remotely activated with the gateway to further distract the unidentified individual.

In another embodiment, the threat tracking module 256 may identify a person with a weapon as a potential threat using analytics module 242.

Figure 3:
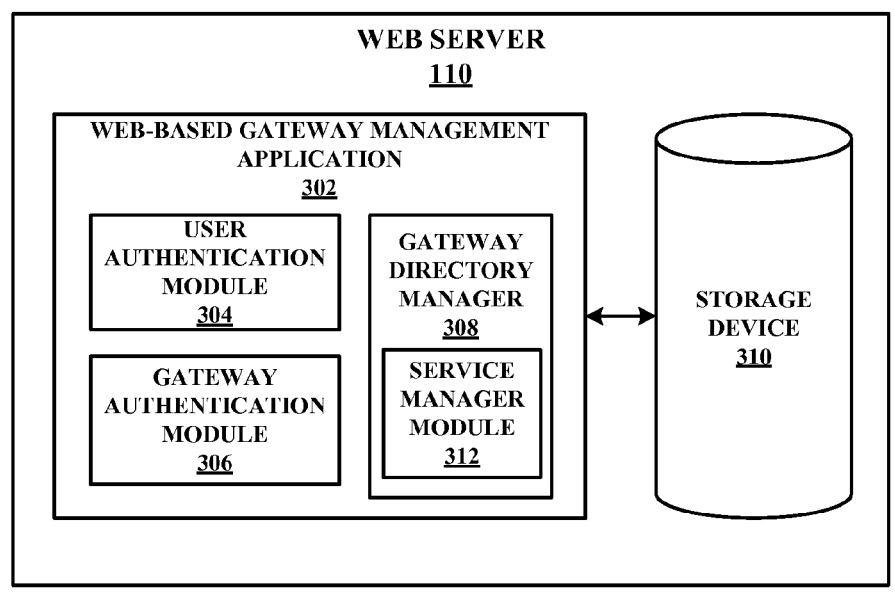
FIG. 3 is a block diagram illustrating an example embodiment of a web server.

FIG. 3 is a block diagram illustrating an example embodiment of a web server 110 (also referred to as a web-based host). The web server 110 comprises a web-based gateway management application 302 and a storage device 310. The web-based gateway management application 302 identifies a gateway associated with a user at the client device, authenticates with the user at the client device, and authenticates with the identified gateway.

In one embodiment, the web-based gateway management application 302 includes a gateway directory manager 308, a user authentication module 304, and a gateway authentication module 306. The gateway directory manager 308 identifies a gateway associated with a user profile. For example, a user may only be able to access a particular gateway or a particular set of devices connected to a gateway. As such, a west coast manager of an organization may be able to access monitored sites only from west coast stores of the organization. In contrast, a user with higher privileges may be able to access more gateways and devices. As such, the CEO of an organization with stores throughout the United States may be able to view monitoring data from all the stores in the United States. Law enforcement officials may be authenticated so that they can monitor, in a live manner, video and audio feeds from a building under threat. For example, SWAT teams may monitor live the location of an unidentified individual who may be a potential threat using a client device communicating with the gateway.

In another embodiment, the gateway directory manager 308 includes a service manager module 312 to enable add-on services to the user at the client device. For example, the add-on services include, but are not limited to, remote storage, remote audio, two-way audio, dynamic backup, or reporting based on the user profile.

The user authentication module 304 authenticates the web server 110 with the user at the client device based on the user profile. For example, the web server 110 verifies the username and password of the user at the client device.

The gateway authentication module 306 authenticates the identified gateway. For example, the web server 110 receives a unique token from the identified gateway to authenticate the identified gateway prior to establishing secured communication between the web server and the gateway.

The storage device 310 may be used to store user profiles, tokens from gateways, a directory of gateways with corresponding devices, services from the gateways, a directory of gateways associated with a user profile, and a directory of connected security devices associated with a user profile.

Figure 4:
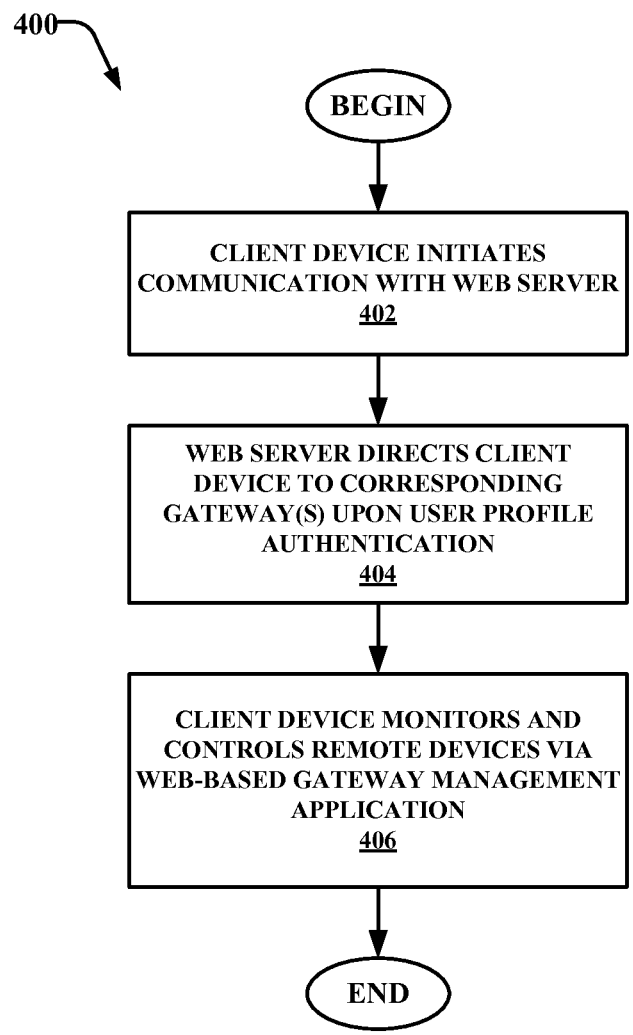
FIG. 4 is a flow chart of one embodiment of an example method for monitoring and controlling devices attached to a gateway.

FIG. 4 is a flow chart of one embodiment of an example method 400 for monitoring and controlling devices attached to a gateway. At 402, a user at a client device initiates communication with a web server to access monitoring data from the devices connected to a gateway. At 404, the web server directs the client device to the corresponding gateway based on the user profile of the user at the client device. At 406, the client device is able to monitor and control from a central interface monitoring and controlling devices connected to the identified gateway(s). In one embodiment, the client device receives an aggregated view of all security devices from several correlated gateways by communicating with only one gateway.

Figure 5:
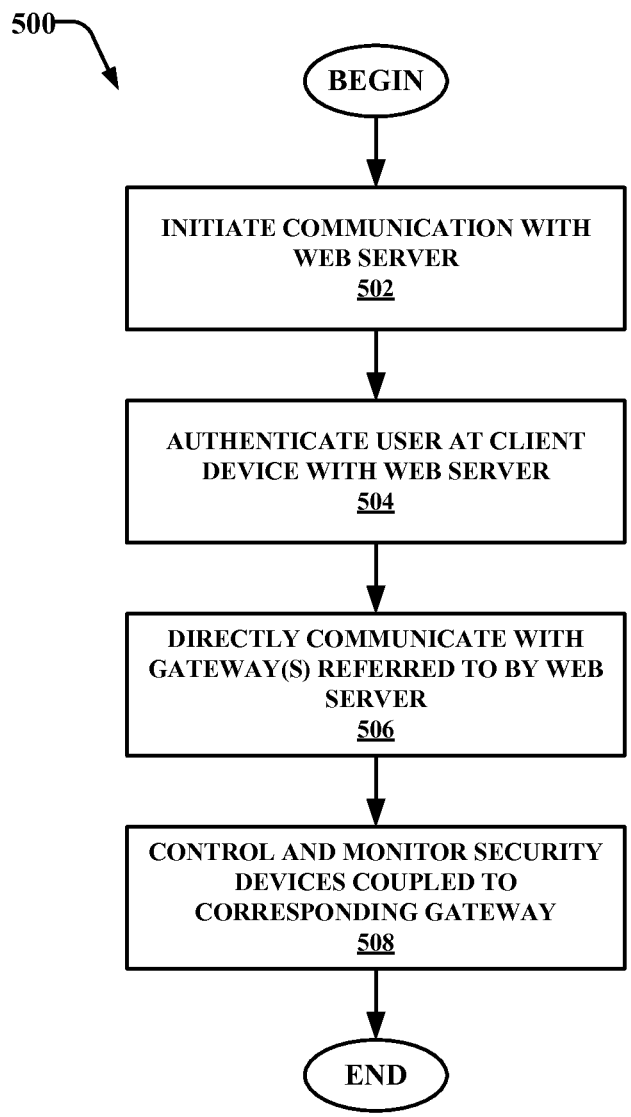
FIG. 5 is a flow chart of one embodiment of an example method for communicating with a gateway and a web server from a client device.

FIG. 5 is a flow chart of one embodiment of an example method 500 for communicating with a gateway and a web server from a client device. At 502, a client device initiates a communication with a web server. At 504, the client device authenticates the user with the web server. At 506, the client device directly communicates with the gateway(s) referred to and identified by the web server. At 508, the client device is able to control and monitor devices connected to the corresponding gateway. In another embodiment, the client device can control and monitor devices connected to other correlated gateways.

Figure 6:
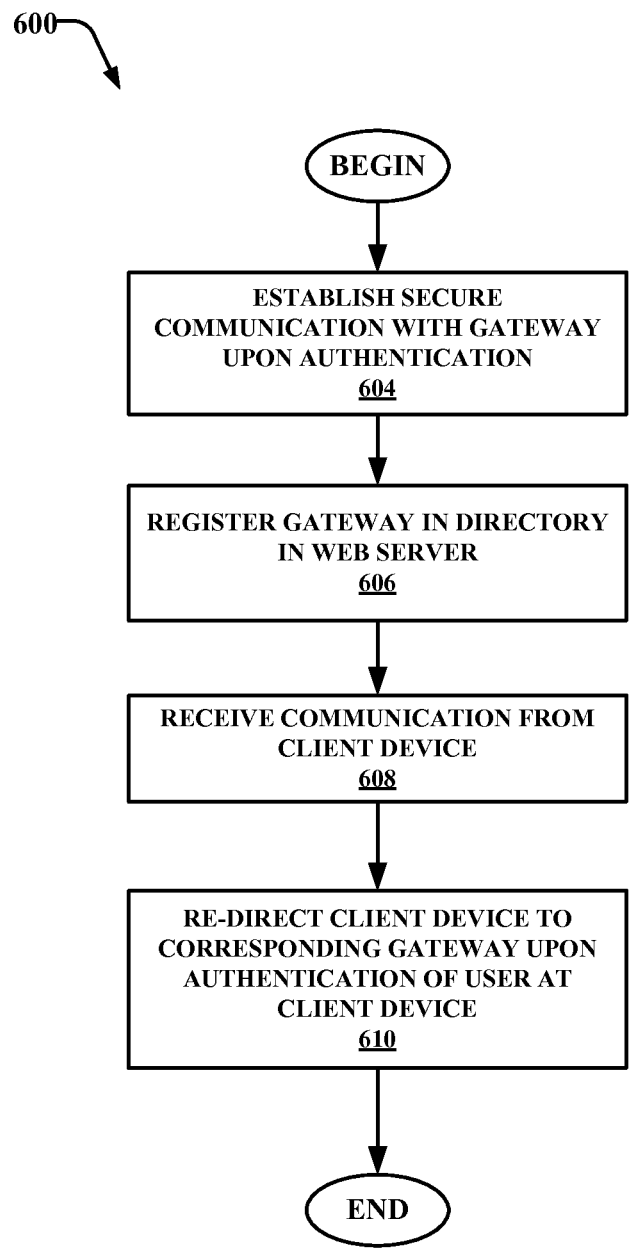
FIG. 6 is a flow chart of one embodiment of an example method for communicating with a gateway and a client device from a web server.

FIG. 6 is a flow chart of one embodiment of an example method 600 for communicating with a gateway and a client device from a web server. At 604, the web server establishes a secure communication with a gateway upon authentication of the gateway. At 606, the web server registers the gateway in a directory in the web server. At 608, the web server receives a communication from the client device to access monitoring data. At 610, the web server re-directs the client device to the corresponding gateway upon authentication of the user at the client device. As such, the client device communicates directly with the identified gateway, thereby saving bandwidth resources otherwise used by the web server.

Figure 7:
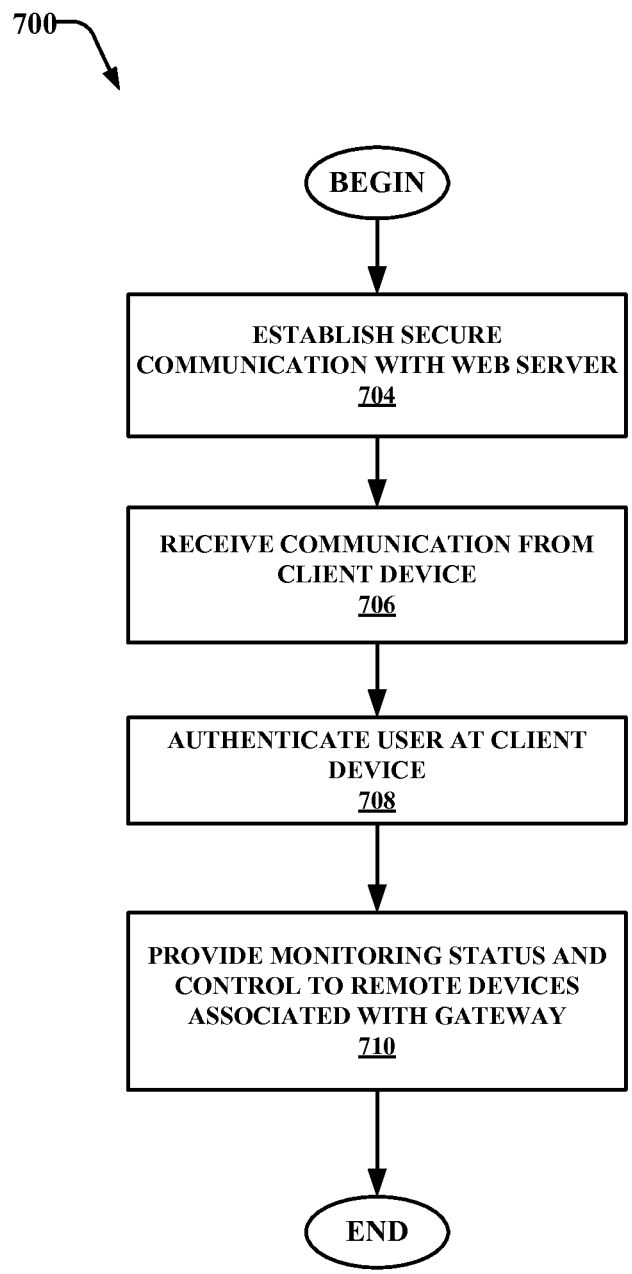
FIG. 7 is a flow chart of one embodiment of an example method for communicating with a web server and a client device from a gateway.

FIG. 7 is a flow chart of one embodiment of an example method 700 for communicating with a web server and a client device from a gateway. At 704, the gateway establishes a secure communication with the web server. At 706, the gateway identified by a web server receives a communication from a client device. At 708, the gateway authenticates the user at the client device. At 710, the gateway provides monitoring status and control to devices connected to the gateway. In another embodiment, the gateway is correlated to other gateways by the web server. In other words, the web server may introduce the gateway to establish a direct secure communication with other gateways.

In another embodiment, the gateway is interfaced with the client device with an API. The corresponding monitoring or controlling device coupled to the gateway is monitored and controlled with an application module. Interaction of the application module with the corresponding monitoring or controlling device is enabled with a device driver.

In another embodiment, communication with the web server and the client device is enabled with a communication module of the gateway. The client device is enabled to monitor or control the plurality of monitoring or controlling devices coupled to the gateway with a remote devices management module of the gateway.

In one embodiment, enabling communication with the web server and the client device comprises authenticating a user at the client device based on a user profile of the user with a user authentication module. The user at the client device is limited or granted access to the monitoring and controlling devices according to the user's access policy. A communication between the gateway and the web server is authenticated with a web server authentication module. The peer-to-peer communication between gateways is enabled with a transport module.

In one embodiment, enabling the client device to monitor or control the monitoring or controlling devices connected to the gateway comprises analyzing audio and video from the monitoring devices and to generating events based on the analysis with an analytics module. The events generated from the analytics module are aggregated with an event aggregation module. A command is communicated to at least one controlling device of the corresponding gateway based on an event identified in the aggregated events based on an event configuration with an event-based control module. A command is communicated to at least one controlling device of the corresponding gateway based on a command communicated from the client device with a client-based control module.

Figure 8:
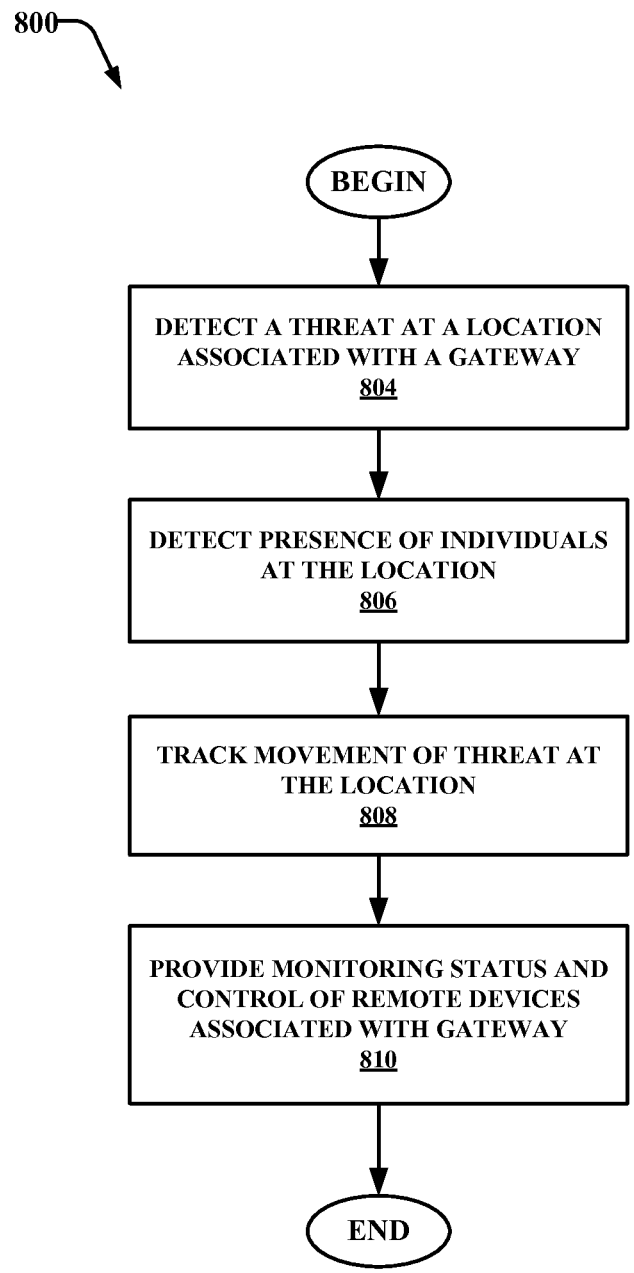
FIG. 8 is a flow chart of one embodiment of an example method for monitoring a threat with the gateway of FIG. 2A.

FIG. 8 is a flow chart of one embodiment of an example method 800 for monitoring a threat with the gateway of FIG. 2A. At operation 804, the gateway detects a threat at a location associated with the gateway. At operation 806, the gateway detects the presence of individuals at the location of the gateway. At operation 808, the gateway tracks movement of the threat at the location of the gateway. At operation 810, the gateway provides monitoring status and control of remote devices associated with the gateway.

Figure 9:
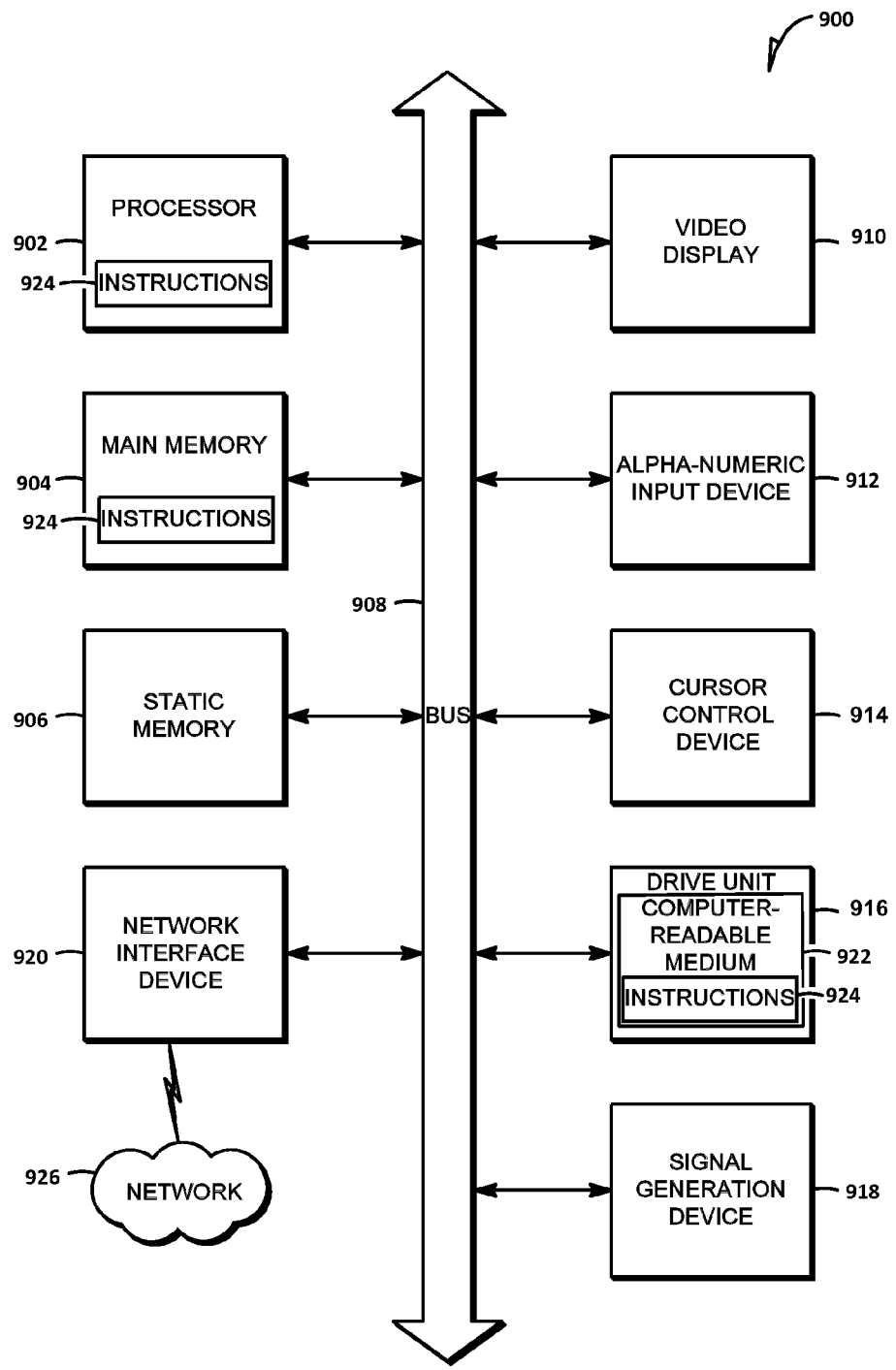
FIG. 9 shows a diagrammatic representation of a machine in the example form of a computer system within which a set of instructions may be executed to cause the machine to perform any one or more of the methodologies discussed herein.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatuses or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A gateway comprising:
a memory;
a processor coupled to the memory, the processor comprising a communication module, a remote device management module, and a threat event module,
the communication module configured to communicate with a web server, a client device, and at least one other gateway, and to copy a configuration of the gateway to the at least one other gateway;
the remote device management module configured to aggregate monitoring data from a plurality of security devices coupled to the gateway and from at least one other security device respectively coupled to the at least one other gateway, the at least one other gateway correlated with the gateway by the web server, and to enable the client device to monitor the plurality of security devices coupled to the gateway and the at least one other security device coupled to the at least one other gateway;
the threat event module configured to detect, identify, and track a threat at a location associated with the gateway, the threat event module comprising:
a presence detection module configured to determine whether an individual at a facility at the location associated with the gateway has been identified in a directory of individuals with granted access to the facility, and to identify an individual unidentified in the directory as the threat; and
a threat tracking module configured to access a map of the facility, to track a location of an individual identified in the directory at the facility, to cause a display of the location of the individual identified in the directory in the map of the facility, to track a location of the individual unidentified in the directory at the facility, to cause a display of the location of the individual unidentified in the directory in the map of the facility, and to control at least one of the plurality of security devices based on the location of the individual unidentified in the directory at the facility.

2. The gateway of claim 1, wherein the threat event module further comprises:
a threat detection module configured to detect the threat at the location;
a presence detection module configured to identify the threat at the location; and
a threat tracking module configured to track a movement of the threat at the location.

3. The gateway of claim 2, wherein the threat detection module further comprises:
a system triggered module configured to detect a threat based on user-defined parameter thresholds from the security device; and
a user triggered module configured to detect a threat based on a user triggered alert notification received at the gateway.

4. The gateway of claim 2, wherein the presence detection module further comprises:
a facial recognition module configured to identify an individual using a facial recognition algorithm applied onto an image provided by the security device at the gateway;
a voice recognition module configured to identify an individual using a voice recognition algorithm applied to an audio file provided by at least one of the plurality of security devices at the gateway; and
a people count module configured to count a number of persons from the image provided by at least one of the plurality of the security devices at the gateway.

5. The gateway of claim 1, wherein the processor further comprises:
an application programming interface (API) configured to interface the gateway with a client device;
an application module configured to monitor and control the plurality of security devices coupled to the gateway;
a device driver configured to enable interaction of the application module with the corresponding security device; and
the communication module further configured to receive additional APIs, respective application modules, and respective device drivers.

6. The gateway of claim 5, wherein the communication module comprises:
a user authentication module configured to authenticate a user at the client device based on a user profile of the user;
a user access policy module configured to limit or grant the user at the client device access to at least one of the plurality of security devices;
a web server authentication module configured to authenticate a communication between the gateway and the web server; and
a transport module configured to enable peer-to-peer communication between gateways, the client device, and the web server.

7. The gateway of claim 5, wherein the remote device management module comprises:
an analytics module configured to analyze audio, video, and data from the plurality of security devices and to generate events based on the analysis;
an event aggregation module configured to aggregate events generated from the analytics module;
an event-based control module configured to communicate a command to at least one of the security device of the corresponding gateway based on an event identified in the aggregated events based on an event configuration; and
a client-based control module configured to communicate a command to the at least one security device of the corresponding gateway based on a command communicated from the client device.

8. The gateway of claim 5, wherein the security device comprises a camera control device, an audio control device, a switch, a HVAC system, a video device, an audio device, a biometric sensor, an access control device, a temperature sensor, an RFID device, or a motion-controlled sensor.

9. The gateway of claim 5, wherein the web server comprises a web-based gateway management application configured to identify a gateway associated with a user at the client device, to authenticate with the user at the client device, to authenticate with the identified gateway, and to correlate the identified gateway with the other gateways.

10. The gateway of claim 9, wherein the web-based gateway management application comprises:
a gateway directory manager configured to identify a gateway associated with a user profile;
a user authentication module configured to authenticate with the user at the client device based on the user profile; and
a gateway authentication module configured to authenticate the identified gateway,
wherein the gateway directory manager comprises a service manager module configured to enable an add-on service to the user at the client device.

11. The gateway of claim 10, wherein the add-on service comprises remote storage, remote audio, two-way audio, dynamic backup, reporting based on the user profile, organization topology mapping, or gateway access configuration.

12. The gateway of claim 5, wherein the client device is configured to communicate with a first gateway identified by the web server, to receive monitoring data from a second security device coupled to a second gateway, to control the second security device coupled to the second gateway by communicating with the first gateway coupled to a first security device, the first gateway correlated with the second gateway by the web server.

13. A method comprising:
identifying at a gateway, a web server, a client device, and at least one other gateway;
aggregating monitoring data from a plurality of security devices coupled to the gateway and from at least one other security device respectively coupled to the at least one other gateway, the at least one other gateway correlated with the gateway by the web server;
enabling the client device to monitor and control the plurality of security devices coupled to the gateway and the at least one other security device coupled to the at least one other gateway;
detecting, identifying, and tracking a threat at a location associated with the gateway;
determining whether an individual at a facility at the location associated with the gateway has been identified in a directory of individuals with granted access to the facility;
identifying an individual unidentified in the directory as the threat;
accessing a map of the facility;
tracking a location of an individual identified in the directory at the facility;
causing a display of the location of the individual identified in the directory in the map of the facility;
tracking a location of the individual unidentified in the directory at the facility;
causing a display of the location of the individual unidentified in the directory in the map of the facility; and
controlling at least one of the plurality of security devices based on the location of the individual unidentified in the directory at the facility.

14. The method of claim 13, further comprising:
detecting a threat based on user-defined parameter thresholds from the security device; and
detecting a threat based on a user triggered alert notification received at the gateway.

15. The method of claim 13, further comprising:
retrieving data from a directory of individuals of an organization associated with the location of the gateway;
identifying an individual using a facial recognition algorithm applied onto an image provided by the security device at the gateway with the data from the directory;
identifying an individual using a voice recognition algorithm applied to an audio provided by at least one of the plurality of security devices at the gateway with the data from the directory; and
counting a number of persons from the image provided by at least one of the plurality of security devices at the gateway.

16. A non-transitory computer-readable storage medium storing a set of instructions that, when executed by a processor, cause the processor to perform operations, comprising:
identifying at a gateway, a web server, a client device, and at least one other gateway;
aggregating monitoring data from a plurality of security devices coupled to the gateway and from at least one other security device respectively coupled to the at least one other gateway, the at least one other gateway correlated with the gateway by the web server, and enabling the client device to monitor and control at least one of the plurality of security devices coupled to the gateway and the at least one other security device coupled to the at least one other gateway;
detecting, identifying, and tracking a threat at a location associated with the gateway;
determining whether an individual at a facility at the location associated with the gateway has been identified in a directory of individuals with granted access to the facility;
identifying an individual unidentified in the directory as the threat;
accessing a map of the facility;
tracking a location of an individual identified in the directory at the facility;
causing a display of the location of the individual identified in the directory in the map of the facility;
tracking a location of the individual unidentified in the directory at the facility;
causing a display of the location of the individual unidentified in the directory in the map of the facility; and
controlling at least one of the plurality of security devices based on the location of the individual unidentified in the directory at the facility.

* * * * *